United States Patent
Kim (10) Patent No.: US 9,207,086 B2
(45) Date of Patent: Dec. 8, 2015

(54) METHOD FOR DETERMINING LOCATION OF VEHICLE

(71) Applicant: HYUNDAI MOBIS CO., LTD., Seoul (KR)

(72) Inventor: Dong Ho Kim, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/465,735

(22) Filed: Aug. 21, 2014

(65) Prior Publication Data
US 2015/0127250 A1    May 7, 2015

(30) Foreign Application Priority Data
Nov. 5, 2013    (KR) .................. 10-2013-0133644

(51) Int. Cl.
| G01C 21/00 | (2006.01) |
| G01C 21/20 | (2006.01) |
| G01S 19/13 | (2010.01) |
| G01S 19/48 | (2010.01) |
| G01S 19/49 | (2010.01) |

(52) U.S. Cl.
CPC .................. G01C 21/20 (2013.01); G01S 19/13 (2013.01); G01S 19/48 (2013.01); G01S 19/49 (2013.01)

(58) Field of Classification Search
None
See application file for complete search history.

(56) References Cited

U.S. PATENT DOCUMENTS 8,521,427 B1 *  8/2013  Luyks ........................... 701/500
2012/0258705 A1 * 10/2012  Wisnewski et al. ........... 455/423

FOREIGN PATENT DOCUMENTS

KR    10-2011-0080677 A    7/2011

* cited by examiner

Primary Examiner — Adam Alharbi
(74) Attorney, Agent, or Firm — Knobbe Martens Olson & Bear, LLP (57) ABSTRACT

A method for determining the location of a vehicle may include: determining, by a controller, whether first location information of a vehicle is normally received through a GNSS (Global Navigation Satellite System) receiver; determining whether two or more infrastructure devices exist within a reference distance from the vehicle; and determining the location of the vehicle according to whether the first location information of the vehicle is normally received and whether two or more infrastructure devices exist.

9 Claims, 9 Drawing Sheets

| INFRASTRUCTURE DEVICE ID | CURRENT TIME | LOCATION |

METHOD FOR DETERMINING LOCATION OF VEHICLE

CROSS-REFERENCES TO RELATED APPLICATIONS

The present application claims priority to Korean application number 10-2013-0133644, filed on Nov. 5, 2013, which is incorporated by reference in its entirety.

BACKGROUND

The present disclosure relates to a method for determining the location of a vehicle, and more particularly, to a method for determining the location of a vehicle, which is capable of more precisely determining the location of a vehicle by correcting an error contained in location information of the vehicle, received through a GNSS (Global Navigation Satellite System) receiver.

The GNSS refers to a system which provides information on the location, altitude, and speed of an object on the earth, using a satellite orbiting the earth.

The GNSS may provide precise location information with a resolution of 1 m or less. Furthermore, the GNSS may not only be applied to the military sector, but also widely applied to private sectors which include land surveying, emergency relief, communication, and location guide of a mode of transportation such as airplane, ship, or vehicle.

The GNSS includes one or more GNSS satellites, a GNSS receiver for receiving a signal from the GNSS satellites and a monitoring station on the earth. The GNSS receiver may receive a signal transmitted from a GNSS satellite, and determine a location based on a distance from the GNSS satellite.

The current GNSS systems have been monopolized by the GPS (Global Positioning System) which was developed for military use by US Department of Defense in the early 1970s, in order to precisely measure the location of a specific object. Recently, however, GLONASS of Russia and Galileo of EU have been developed to cope with the GPS.

The related art of the present invention is disclosed in Korean Patent Laid-open Publication No. 10-2011-0080677 published on Jul. 13, 2011, and entitled "System for forecasting location for vehicle in accordance with receiving interruption of GPS signal and method for forecasting location using the same"

As described above, the GNSS must receive a signal from a GNSS satellite through the GNSS receiver. Thus, when a signal is not normally received from the GNSS receiver for a long time or distorted due to a natural phenomenon or interference with an electronic device of a vehicle, the reliability of the vehicle location sensed through the GNSS may be significantly degraded.

In order to solve this problem, a technique for precisely determining the location of a vehicle by reflecting the motion of the vehicle or applying DGPS (Differential GPS) technology have been recently developed.

However, such a conventional technique includes factors which must be additionally analyzed. The DGPS may be implemented in the environment where independent two GPS receivers are provided to communicate with each other. Furthermore, the DGPS requires various variables for calculating data and a complex calculation process.

SUMMARY

Embodiments of the present invention are directed to a method for determining the location of a vehicle, which is capable of correcting an error contained in location information of a vehicle, received through a GNSS receiver, by reflecting fixed absolute location information of infrastructure devices, thereby more precisely determining the location of the vehicle.

In one embodiment, a method for determining the location of a vehicle may include: determining, by a controller, whether first location information of a vehicle is normally received through a GNSS receiver; determining whether two or more infrastructure devices exist within a reference distance from the vehicle; and determining the location of the vehicle according to whether the first location information of the vehicle is normally received and whether two or more infrastructure devices exist.

The determining of whether the first location information of the vehicle is normally received may include: determining whether the intensity of the received first location information of the vehicle is equal to or more than reference intensity; and determining whether a location change per unit time based on the received first location information of the vehicle falls within a reference change.

In the determining of the location of the vehicle, when the first location information of the vehicle is normally received and two or more infrastructure device exists within the reference distance from the vehicle, the controller may correct the first location information of the vehicle by referring to the locations of the infrastructure devices.

The determining of the location of the vehicle may include: storing the first location information of the vehicle, received through the GNSS receiver; extracting second location information of the vehicle, based on the locations of the infrastructure devices; calculating and storing a location error of the vehicle based on the extracted second location information of the vehicle and the stored first location information of the vehicle; and correcting the first location information of the vehicle by reflecting the location error.

In the extracting of the second location information of the vehicle, the controller may extract the location of the vehicle in different manners depending on the number of infrastructure devices.

In the determining of the location of the vehicle, when the first location information of the vehicle is normally received and two or more infrastructure devices do not exist within the reference distance from the vehicle, the controller may correct the first location information of the vehicle by referring to the most recent location of the infrastructure device.

The determining of the location of the vehicle may include: storing the first location information of the vehicle, received through the GNSS receiver; and correcting the first location information of the vehicle by reflecting the stored location error based on the most recent location of the infrastructure device.

In the determining of the location of the vehicle, when the first location information of the vehicle is not normally received and two or more infrastructure devices exist within the reference distance from the vehicle, the controller may determine the location of the vehicle by referring to the locations of the infrastructure devices.

The determining of the location of the vehicle may include: extracting, by the controller, second location information of the vehicle based on the locations of the infrastructure devices; and determining the location of the vehicle based on the extracted second location information.

In the extracting of the second location information of the vehicle, the controller may extract the location of the vehicle in different manners depending on the number of infrastructure devices.

In the determining of the location of the vehicle, when the first location information of the vehicle is not normally received and two or more infrastructure devices do not exist within the reference distance from the vehicle, the controller may determine the location of the vehicle based on traveling information of the vehicle and the location of the vehicle, which is most recently stored in a memory unit.

In accordance with the embodiment of the present invention, the fixed absolute location information of the infrastructure devices may be reflected to correct an error contained in the location information of the vehicle, received through the GNSS receiver. Thus, the location of the vehicle may be more precisely determined.

Furthermore, it is possible to improve the operation precision of a navigation system and various location-based applications, which guide a path using location information of a vehicle.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
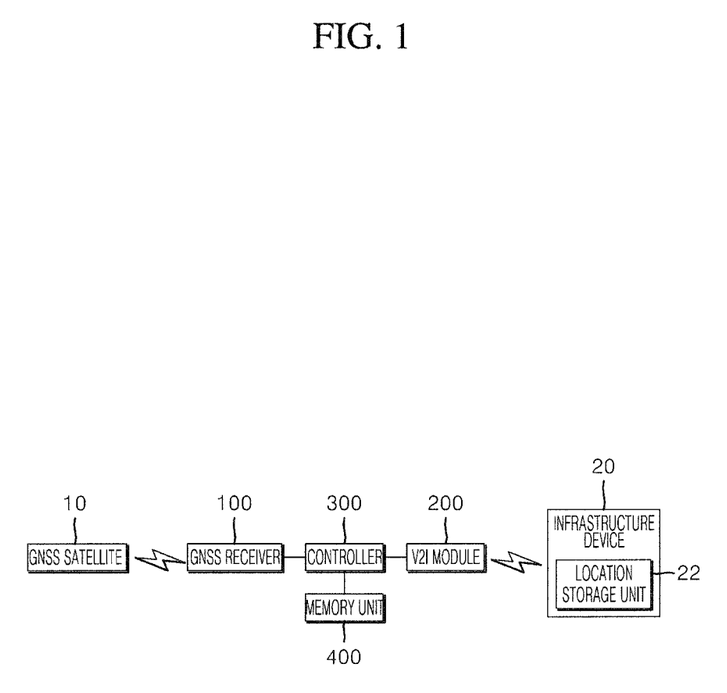
FIG. 1 is a function block diagram of an apparatus for implementing a method for determining the location of a vehicle in accordance with an embodiment of the present invention.

FIG. 1 is a function block diagram of an apparatus for implementing a method for determining the location of a vehicle in accordance with an embodiment of the present invention.

Figure 2:
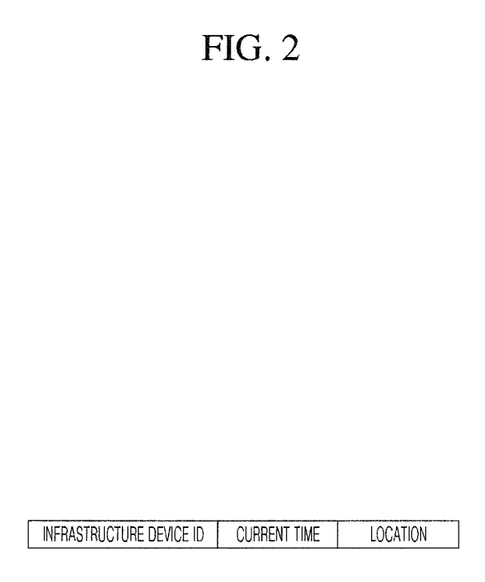
FIG. 2 is a diagram illustrating the structure of information which is received from an infrastructure device through a V2I (Vehicle-to-Infrastructure) module.

FIG. 2 is a diagram illustrating the structure of information which is received from an infrastructure device through a V2I (Vehicle-to-Infrastructure) module.

Figure 3:
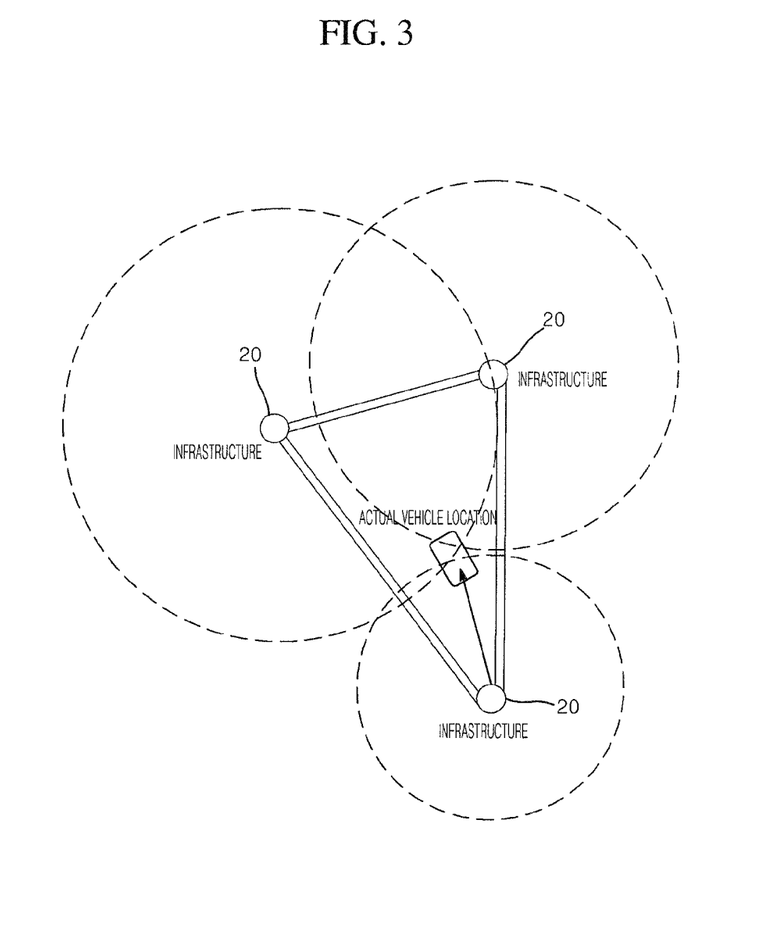
FIG. 3 is a diagram illustrating a second location of a vehicle, which is extracted on the basis of the locations of three infrastructure devices in accordance with the embodiment of the present invention.

FIG. 3 is a diagram illustrating a second location of a vehicle, which is extracted on the basis of the locations of three infrastructure devices in accordance with the embodiment of the present invention.

Figure 4:
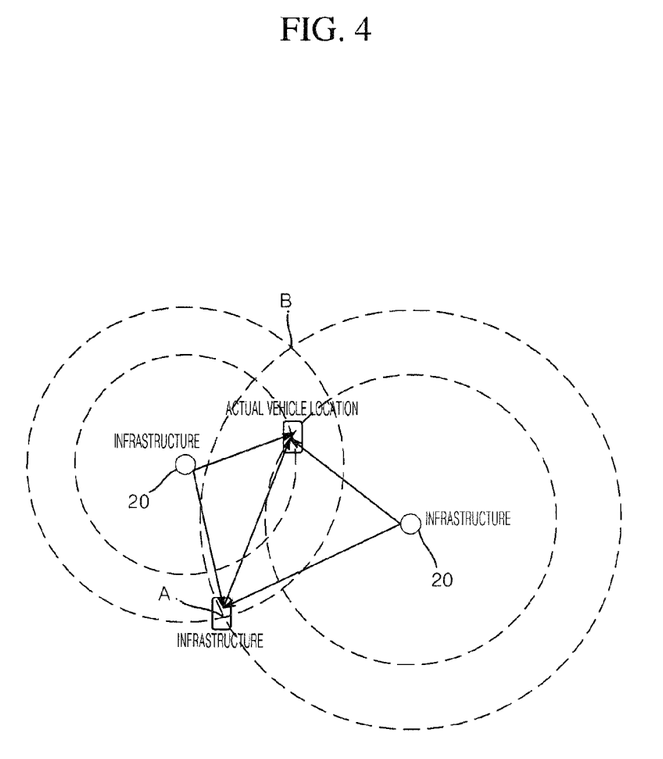
FIG. 4 is a diagram illustrating a second location of a vehicle, which is extracted on the basis of the locations of two infrastructures in accordance with the embodiment of the present invention.

FIG. 4 is a diagram illustrating a second location of a vehicle, which is extracted on the basis of the locations of two infrastructures in accordance with the embodiment of the present invention.

Referring to FIGS. 1 to 4, the apparatus for implementing the method for determining the location of a vehicle in accordance with the embodiment of the present invention may include a GNSS (Global Navigation Satellite System) receiver 100, a V2I module 200, a controller 300, and a memory unit 400.

The GNSS receiver 100 is a device which receives location information of a vehicle with the GNSS receiver 100 from a GNSS satellite 10, and may include a GPS receiver (not illustrated) or GLONASS receiver (not illustrated) which receives location information.

Since the GNSS satellite 10, a ground control system (not illustrated), and the technique for acquiring location information of a vehicle with the GNSS receiver 100 through signal transmission/reception are publicly-known, the detailed descriptions thereof are omitted herein.

The V2I module 200 may be configured to receive information containing location information of the infrastructure device 20 from the infrastructure device 20. For example, the V2I module 200 may receive the information of the infrastructure device 20 at each predetermined period.

The method through which the V2I module 200 and the infrastructure device 20 exchange information may include all communication methods as long as the infrastructure device 20 can communicate with a vehicle. Examples of the communication methods may include WAVE (Wireless Access in Vehicular Environments) communication and 3G and 4G mobile communications.

Specifically, the information received from the infrastructure device 20 through the V2I module 200 may have a structure illustrated in FIG. 2.

Since a location storage unit 22 of the infrastructure device 20 stores GNSS absolute location information of the place at which the infrastructure device 20 is installed, the V2I module 200 may receive information containing the location information of the infrastructure device 20 from the infrastructure device 20.

Specifically, the information may include ID (Identification) information of the infrastructure device 20, information on the time at which the infrastructure device 20 transmits the information, and the GNSS absolute location information of the infrastructure device 20. The ID information may be used to distinguish the corresponding infrastructure device 20 from a plurality of infrastructure devices 20, when plural pieces of information are received from the respective infrastructure devices 20.

The information received by the V2I module 200 is not limited thereto. Thus, the information may include other pieces of information.

The controller 300 may determine the location of the vehicle based on the location information of the vehicle, received through the GNSS receiver 100, and the location information of the infrastructure device 20, received through the V2I module 200.

In the present embodiment, the location information of the vehicle, received through the GNSS receiver 100, may be referred to as first location information, and the location information of the vehicle, extracted on the basis of the location of the infrastructure device 20, may be referred to as second location information.

Furthermore, the absolute location of the infrastructure device 20 as well as the first location information of the vehicle, received through the GNSS receiver 100, may be reflected to more precisely determine the location of the vehicle.

Specifically, the controller 300 may determine the location of the vehicle in different manners depending on whether the first location information of the vehicle is normally received and whether two or more infrastructure devices 20 exist within a reference distance from the vehicle.

The reference distance may indicate a distance between the vehicle and an infrastructure device 20, at which information can be normally transmitted and received between the V2I module 200 and the infrastructure device 20. The reference distance may differ depending on the characteristic of the V2I module 200.

In the present embodiment, when the second location information is extracted on the basis of the locations of infrastructure devices 20, the location of the vehicle cannot be extracted through one infrastructure device 20. Thus, the controller 300 may determine whether two or more infrastructure devices 20 exist within the reference distance from the vehicle.

As such, the controller 300 may determine the location of the vehicle according to whether the first location information of the vehicle is normally received and whether two or more infrastructure devices 20 exist. Thus, the process of determining the location of the vehicle may be divided into four cases.

The first case is where the first location information of the vehicle is normally received and two or more infrastructure devices 20 exist within the reference distance, the second case is where the first location information of the vehicle is normally received and two or more infrastructure devices 20 do not exist within the reference distance from the vehicle, the third case is where the first location information of the vehicle is not normally received and two or more infrastructure devices 20 exists within the reference distance from the vehicle, and the fourth case is where the first location information of the vehicle is not normally received and two or more infrastructures 20 do not exist within the reference distance from the vehicle.

Specifically, in relation to whether the first location information of the vehicle is normally received through the GNSS receiver 100, the controller 300 may determine whether the intensity of the received first location information of the vehicle is equal to or more than reference intensity.

The reference intensity indicates the intensity at which normal information can be considered to be contained, and may differ depending on the characteristic of the GNSS receiver 100.

Thus, when the intensity of the first location information of the vehicle, received through the GNSS receiver 100, is less than the reference intensity, it may indicate that the corresponding information has low reliability. Thus, the controller 300 may ignore the corresponding information.

Furthermore, the controller 300 may determine whether a location change of the vehicle per unit time based on the received first location information of the vehicle falls within a reference change, thereby determining whether the first location information of the vehicle is normally received.

The reference change may indicate a location change of the vehicle, which may occur while the vehicle normally travels, that is, a vehicle speed. The reference change may differ depending on the characteristic of the vehicle.

For example, when the first location information of the vehicle is received at each unit time (one second) and the location change of the vehicle during the corresponding period is 100 m, it may indicate that the speed of the vehicle is 10 m/s. In this case, the controller 300 may determine that an error exists in the first location information.

Thus, when the location change of the vehicle per unit time based on the first location information of the vehicle, which is periodically received, exceeds the reference change, the controller 300 may not consider the corresponding location information.

Hereafter, a specific process of determining the location of the vehicle will be described according to whether the controller 300 normally receives the first location information of the vehicle and whether two or more infrastructure devices 20 exist.

First, when the first location information of the vehicle is normally received and two or more infrastructure devices 20 exist within the reference distance from the vehicle, the controller 300 may correct the first location information of the vehicle by referring to the locations of the infrastructure devices 20, received through the V2I module 200.

For this operation, the controller 300 may determine the number of infrastructure devices 20 within the reference distance from the vehicle based on the information received through the V2I module 200, and extract the second location information of the vehicle based on the locations of the infrastructure devices 20.

Specifically, when the number of infrastructure devices 20 within the reference distance from the vehicle is three or more, the controller 300 may extract the second location information of the vehicle using a triangulation method.

The triangulation method refers to a method which measures the plane locations of points by measuring the sides or angles of a triangle. The controller 300 may calculate a distance between the vehicle and an infrastructure device 20 through time information contained in the information of the infrastructure device 20, received through the V2I module 200, and the time at which the information is received in the vehicle.

That is, the distance between the vehicle and the infrastructure device 20 may be calculated through the following formula: (information transmission speed of infrastructure device 20×(current time−information transmission time of infrastructure device 20).

Furthermore, the controller 300 may extract the GNSS absolute location information of the infrastructure device 20 through the information received from the infrastructure device 20. Thus, as illustrated in FIG. 3, the controller 300 may extract the second location information corresponding to accurate location information of the vehicle among three infrastructure devices 20.

When the number of infrastructure devices 20 within the reference distance from the vehicle is four or more, the controller 300 may extract plural pieces of second information of the vehicle using information of three infrastructure devices 20, and calculate the average of the plural pieces of location information, thereby increasing the precision of the location information.

Furthermore, when the number of infrastructure devices 20 within the reference distance from the vehicle is two, the controller 300 may extract the second location information of the vehicle based on the traveling direction of the vehicle.

Specifically, when the distances between the infrastructure devices 20 and the vehicle are calculated through the information received from the two infrastructure devices 20, concentric circles may be formed at the calculated distances from the two infrastructure devices 20 as illustrated in FIG. 4, and two points A and B at which the concentric circles meet each other may become candidate points of the second location information of the vehicle.

Furthermore, when the traveling direction of the vehicle for the unit time is sensed, the controller 300 may determine which point of the two points corresponds to the initial location of the vehicle. The controller 300 may extract the second location information of the vehicle in such a manner.

That is, when it is determined that the vehicle travels in the forward direction as illustrated in FIG. 4, the controller 300 may check that the point A of the two candidate points A and B is the initial location, and thus extract the second location information of the vehicle.

Then, the controller 300 may calculate a location error of the vehicle based on the extracted second location information of the vehicle and the first location information of the vehicle, received through the GNSS receiver 100, and correct the first location information of the vehicle by reflecting the location error, thereby determining the precise location of the vehicle.

Second, when the first location information of the vehicle is normally received and two or more infrastructure devices 20 do not exist within the reference distance from the vehicle, the controller 300 may correct the first location information of the vehicle by referring to the most recent location of the infrastructure device 20.

That is, when two or more infrastructure devices 20 do not exist within the reference distance from the vehicle, the second location information based on the relative distances from the infrastructure devices 20 cannot be extracted. Thus, the controller 300 may reflect a location error of the vehicle, which is calculated and stored on the basis of the most recent location of the infrastructure device 20.

The first location information of the vehicle, received through the GNSS receiver 100, may have a constant error from the actual location of the vehicle. Thus, the controller 300 may correct the first location information by reflecting the previously stored location error of the vehicle, and thus determine the precise location of the vehicle.

Third, when the first location information of the vehicle is not normally received and two or more infrastructure devices 20 exist within the reference distance from the vehicle, the controller 300 may determine the location of the vehicle by referring to the locations of the infrastructure devices 20.

That is, since the first location information of the vehicle is not normally received, the controller 300 may determine the location of the vehicle by reflecting only the second location information extracted on the basis of the locations of the infrastructure devices 20.

Specifically, since the process of extracting the second location information of the vehicle is performed in the same manner as described in the first case, additional descriptions are omitted herein.

Fourth, when the first location information of the vehicle is not normally received and two or more infrastructure devices 20 do not exist within the reference distance from the vehicle, the controller 300 may determine the location of the vehicle based on the most recent location of the vehicle and traveling information of the vehicle.

In such a situation, the information of the vehicle is not received from both of the GNSS receiver 100 and the V2I module 200. Thus, the controller 300 may determine the location of the vehicle based on the most recent information of the vehicle.

Specifically, the controller 300 may determine the location of the vehicle by reflecting the traveling information containing the speed and direction of the vehicle, based on the location of the vehicle which is most recently stored in the memory unit 400.

That is, the controller 300 may calculate a difference between the current time and the time at which the most recent location of the vehicle is stored, and calculate the moving distance of the vehicle by multiplying the calculated difference by the speed of the vehicle. Then, the controller 300 may combine the moving distance with the direction information of the vehicle so as to determine the current location of the vehicle.

The memory unit 400 may store the first location information of the vehicle, received through the GNSS receiver 100, and the information of the infrastructure device 20, received through the V2I module 200.

Additionally, the memory unit 400 may store a location error of the vehicle, which is based on the first location information and the section location information of the vehicle and calculated through the controller 300. Thus, when no infrastructure device 20 exists within the reference distance from the vehicle, the controller 300 may correct the first location information through the corresponding location error.

Figure 5:
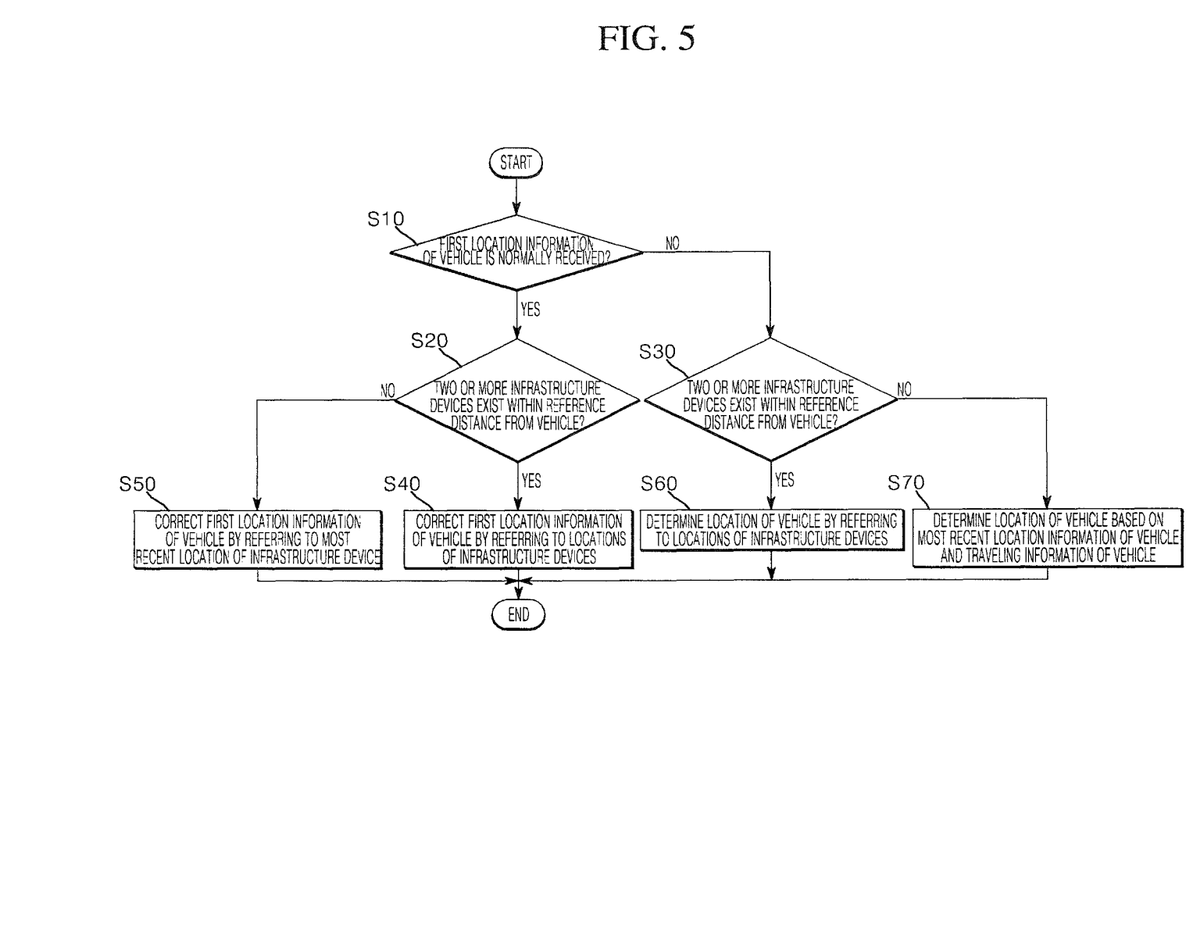
FIG. 5 is a flowchart for explaining a process of implementing the method for determining the location of a vehicle in accordance with the embodiment of the present invention.

FIG. 5 is a flowchart for explaining a process of implementing the method for determining the location of a vehicle in accordance with the embodiment of the present invention.

Figure 6:
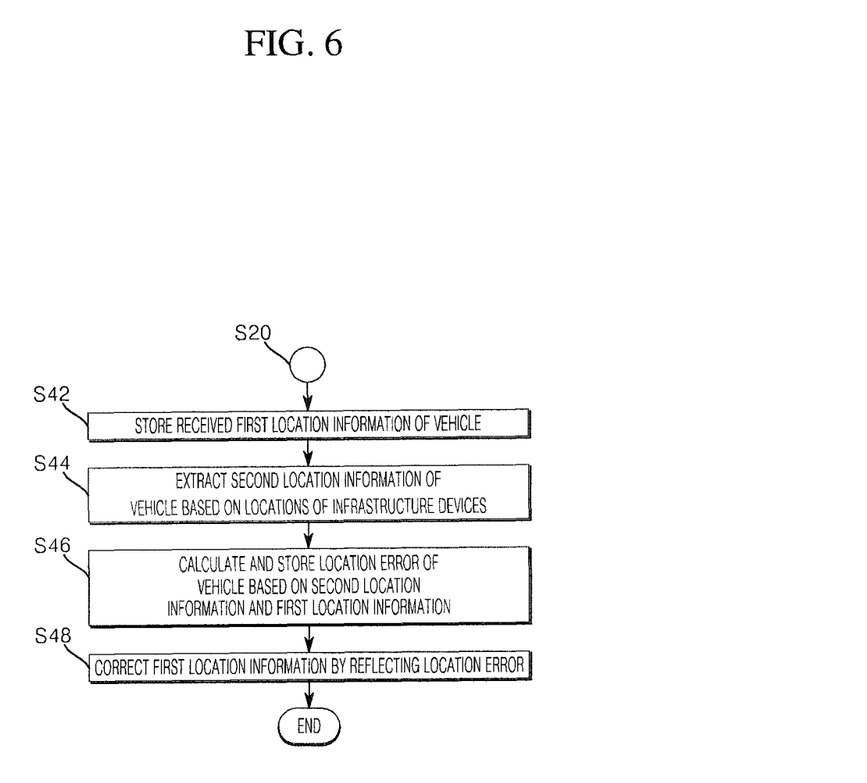
FIG. 6 is a flowchart for explaining a process of determining the location of the vehicle when first location information of the vehicle is normally received and two or more infrastructure devices exist within the reference distance from the vehicle.

FIG. 6 is a flowchart for explaining a process of determining the location of the vehicle when first location information of the vehicle is normally received and two or more infrastructure devices exist within the reference distance from the vehicle.

Figure 7:
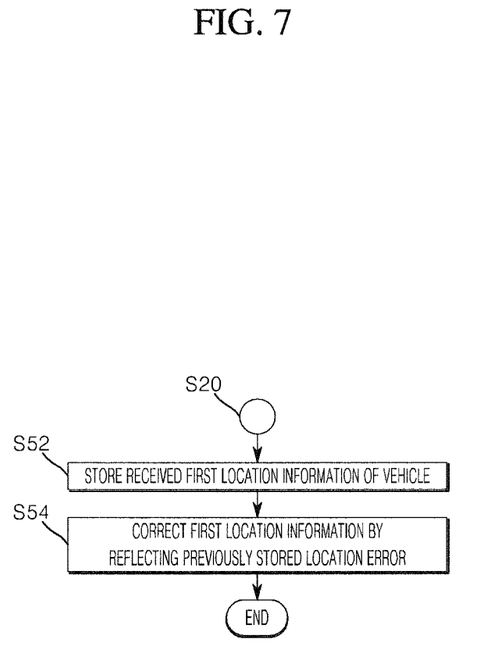
FIG. 7 is a flowchart for explaining a process of determining the location of the vehicle when the first location information of the vehicle is normally received and two or more infrastructure devices do not exist within the reference distance from the vehicle.

FIG. 7 is a flowchart for explaining a process of determining the location of the vehicle when the first location information of the vehicle is normally received and two or more infrastructure devices do not exist within the reference distance from the vehicle.

Figure 8:
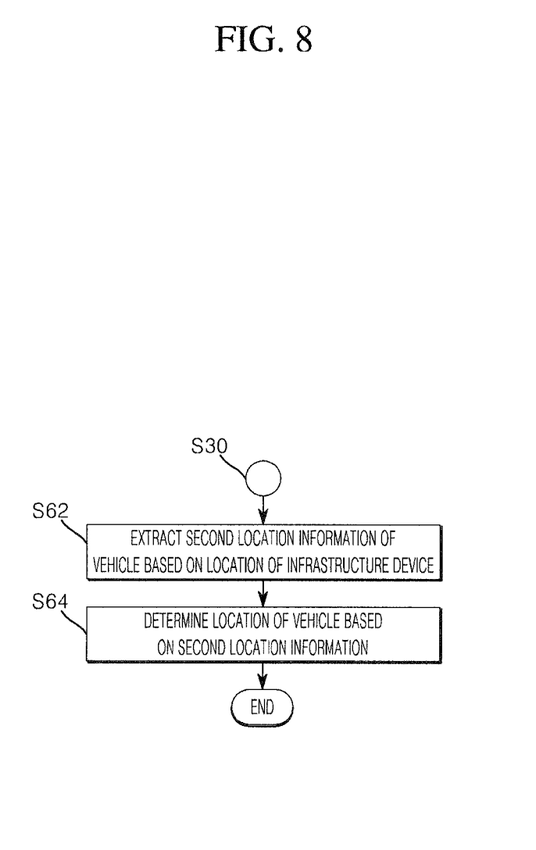
FIG. 8 is a flowchart for explaining a process of determining the location of the vehicle when the first location information of the vehicle is not normally received and two or more infrastructure devices exist within the reference distance from the vehicle.

FIG. 8 is a flowchart for explaining a process of determining the location of the vehicle when the first location information of the vehicle is not normally received and two or more infrastructure devices exist within the reference distance from the vehicle.

Figure 9:
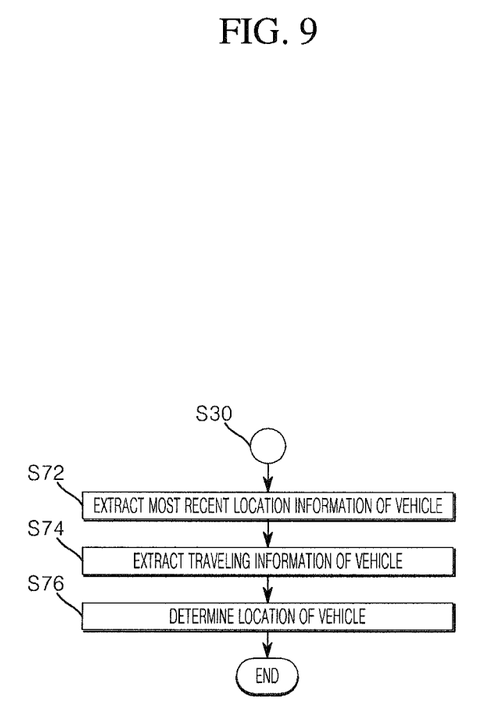
FIG. 9 is a flowchart for explaining a process of determining the location of the vehicle when the first location information of the vehicle is not normally received and two or more infrastructure devices do not exist within the reference distance from the vehicle.

FIG. 9 is a flowchart for explaining a process of determining the location of the vehicle when the first location information of the vehicle is not normally received and two or more infrastructure devices do not exist within the reference distance from the vehicle.

Referring to FIGS. 5 to 9, the method for determining the location of a vehicle in accordance with the embodiment of the present invention will be described. First, the controller 300 may determine whether first location information of the vehicle is normally received through the GNSS receiver 100, at step S10.

Specifically, when the intensity of the first location information of the vehicle, received through the GNSS receiver 100, is equal to or more than the reference intensity and a location change per unit time based on the first location information of the vehicle falls within the reference change, the controller 300 may determine that the first location information of the vehicle is normally received.

The reference intensity indicates the intensity at which normal information can be considered to be contained, and may differ depending on the characteristic of the GNSS receiver 100. The reference change may indicate a location change of the vehicle, which may occur while the vehicle normally travels, that is, a vehicle speed. The reference change may differ depending on the characteristic of the vehicle.

That is, when the intensity of the first location information of the vehicle, received through the GNSS receiver 100, is less than the reference intensity, it may indicate that the corresponding information has low reliability. Thus, the controller 300 may ignore information of which the intensity is less than the reference intensity.

Furthermore, when the location change of the vehicle per unit time based on the first location information of the vehicle, which is periodically received, exceeds the reference change, the controller 300 may ignore the corresponding information.

Then, the controller 300 may determine whether two or more infrastructure devices 20 exist within the reference distance from the vehicle, at steps S20 and S30.

In the present embodiment, in order to more precisely determine the location of the vehicle by referring to the locations of infrastructure devices 20 around the vehicle as well as the first location information of the vehicle, received through the GNSS receiver 100, the controller 300 may determine whether two or more infrastructure devices 20 exist within the reference distance from the vehicle.

Then, the controller 300 may determine the location of the vehicle in different manners, depending on whether the first location information of the vehicle is normally received and whether two or more infrastructure devices exist, at steps S40 to S70.

Specifically, when the first location information of the vehicle is normally received and two or more infrastructure devices 20 exist within the reference distance from the vehicle, the controller 300 may correct the first location information of the vehicle by referring to the locations of the infrastructure devices 20, received through the V2I module 200, at step S40.

More specifically, the controller 300 may store the first location information of the vehicle, received through the GNSS receiver 100, in the memory unit 400 at step S42, and extract the second location information of the vehicle based on the locations of the infrastructure devices 20 at step S44.

At step S44, the controller 300 may extract the location of the vehicle in different manners depending on the number of infrastructure devices 20.

Specifically, when the number of infrastructure devices 20 within the reference distance from the vehicle is three or more, the controller 300 may extract the second location information of the vehicle using a triangulation method.

The distance between the vehicle and an infrastructure device 20 may be calculated through the following formula: (information transmission speed of infrastructure device 20× (current time−information transmission time of infrastructure device 20).

The controller 300 may extract the GNSS absolute location information of the infrastructure device 20 from the information received from the infrastructure device 20. Thus, as illustrated in FIG. 3, the controller 300 may extract the second location information as precise location information of the vehicle, corresponding to the locations of three infrastructure devices 20.

Furthermore, when the number of infrastructure devices 20 within the reference distance from the vehicle is two, the controller 300 may extract the second location information of the vehicle based on a location error of the vehicle.

Specifically, when distances between the infrastructure devices 20 and the vehicle are calculated through information received from the two infrastructure devices 20, concentric circles may be formed at the calculated distances from the two infrastructure devices 20, and two points at which the concentric circles meet each other may become candidate points of the second location information of the vehicle.

Furthermore, when the traveling direction of the vehicle for the unit time is sensed, the controller may determine whether which points of the two points corresponds to the initial location of the vehicle. Thus, the controller 300 may extract the second location information of the vehicle in such a manner.

That is, when it is determined that the vehicle is traveling in the forward direction as illustrated in FIG. 4, the controller 300 may check that the point A of the two candidate points A and B is the initial position of the vehicle, and thus extract the second location information of the vehicle.

The controller 300 may calculate a location error of the vehicle based on the extracted second information of the vehicle and the first location information of the vehicle, stored in the memory unit 400, and store the calculation result in the memory unit 400, at step S46.

Then, the controller 300 may correct the first location information of the vehicle by reflecting the calculated location error at step S48, thereby determining the precise location of the vehicle.

On the other hand, when the first location information of the vehicle is normally received and two or more infrastructure devices 20 do not exist within the reference distance from the vehicle, the controller 300 may correct the first location information of the vehicle by referring the most recent location of the infrastructure device at step S50.

That is, when two or more infrastructure devices 20 do not exist within the reference distance from the vehicle, the controller 300 cannot extract the second location information based on the relative distances from the infrastructure devices 20. Thus, the controller 300 may correct the first location information of the vehicle by referring to the location error which is calculated and stored on the basis of the most recent location of the infrastructure device 20.

Specifically, the controller 300 may store the first location information of the vehicle, received through the GNSS receiver 100, in the memory unit 400 at step S52, and correct the first location information by reflecting the location error stored in the memory unit 400 at step S54.

On the other hand, when the first location information of the vehicle is not normally received and two or more infrastructure devices 20 exist within the reference distance from the vehicle, the controller 300 may determine the location of the vehicle by referring to the locations of the infrastructure devices 20 at step S60.

In this case, since the first location information of the vehicle is not normally received, the controller 300 may determine the location of the vehicle by reflecting only second location information extracted on the basis of the location of the infrastructure device 20.

Specifically, the controller 300 may extract the second location information of the vehicle based on the location of the infrastructure device 20 at step S62, and determine the location of the vehicle based on the extracted second location information at step S64.

On the other hand, when the first location information of the vehicle is not normally received and two or more infrastructure devices 20 do not exist within the reference distance from the vehicle, the controller 300 may determine the location of the vehicle based on the most recent location of the vehicle and the traveling information of the vehicle, at step S70.

In such a situation, the information of the vehicle is not received from both of the GNSS receiver 100 and the V2I module 200. Thus, the controller 300 may determine the location of the vehicle based on the most recent information of the vehicle.

Specifically, the controller 300 may extract the location information of the vehicle, which is most recently stored in the memory unit 400, at step S72, and extract the traveling information of the vehicle from an ECU (not illustrated) of the vehicle at step S74.

Furthermore, the controller 300 may determine the location of the vehicle by reflecting the traveling information containing the speed and direction of the vehicle based on the location information of the vehicle, which is most recently stored in the memory unit 400, at step S76.

That is, the controller 300 may calculate a difference between the current time and the time at which the most recent location of the vehicle is stored, and calculate the moving distance of the vehicle by multiplying the calculated difference by the speed of the vehicle. Then, the controller may combine the moving distance with the direction information of the vehicle so as to determine the current location of the vehicle.

In accordance with the embodiment of the present invention, the fixed absolute location information of the infrastructure devices may be reflected to correct an error contained in the location information of the vehicle, received through the GNSS receiver. Thus, the location of the vehicle may be more precisely determined.

Furthermore, it is possible to improve the operation precision of a navigation system and various location-based applications, which guide a path using location information of a vehicle.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A method for determining a location of a vehicle, the method comprising:
    receiving GNSS (Global Navigation Satellite System) signals during a first drive of the vehicle;
    determining a first location based on the GNSS signals during the first drive, wherein the GNSS signals are strong enough to compute the first location during the first drive;
    subsequently still during the first drive, receiving wireless signals from two or more infrastructure devices, wherein wireless signals from each of the two or more infrastructure devices comprise location information of each device;
    computing a second location based on the location information of each of the two or more infrastructure devices during the first drive;
    calculating a location error based on the first location and the second location during the first drive; and
    still during the first drive, determining the location of the vehicle using the location error.

2. The method of claim 1, wherein a rate of location change is monitored using the GNSS signals, wherein the first location is stored when the rate is lower than a reference value.

3. The method of claim 1, wherein the second location is computed based on the location information of each of the two or more infrastructure devices, wherein computing the second location uses different schemes depending on the number of infrastructure devices.

4. The method of claim 1, wherein during a second drive of the vehicle, when no wireless signals are received from two or more infrastructure devices, determining the location of the vehicle comprises referring to location information of an infrastructure device, wireless signals of which have been most recently received.

5. The method of claim 4, wherein during the second drive, determining of the location of the vehicle comprises:
    correcting a location computed using GNSS signals by reflecting the location of the infrastructure device, wireless signals of which have been most recently received.

6. The method of claim 1, wherein during a second drive, when the GNSS signals are not strong enough, the location of the vehicle is determined using wireless signals from two or more infrastructure devices.

7. The method of claim 6, wherein during the second drive, determining of the location of the vehicle comprises:
    processing the wireless signals to extract location information of the two or more infrastructure devices; and
    computing the location of the vehicle based on the extracted location information.

8. The method of claim 7, wherein computing the location of vehicle uses different schemes depending on the number of infrastructure devices.

9. The method of claim 1, wherein during a second drive, when GNSS signals are not strong enough to compute a location and also no wireless signals are received from infrastructure devices, the location of the vehicle is determined using driving information and location of the vehicle, which is most recently stored in a memory of the vehicle.

* * * * *